Feb. 11, 1964
C. H. WALDHAUER, JR
3,120,760
ACCELEROMETER
Filed April 4, 1960
2 Sheets-Sheet 1
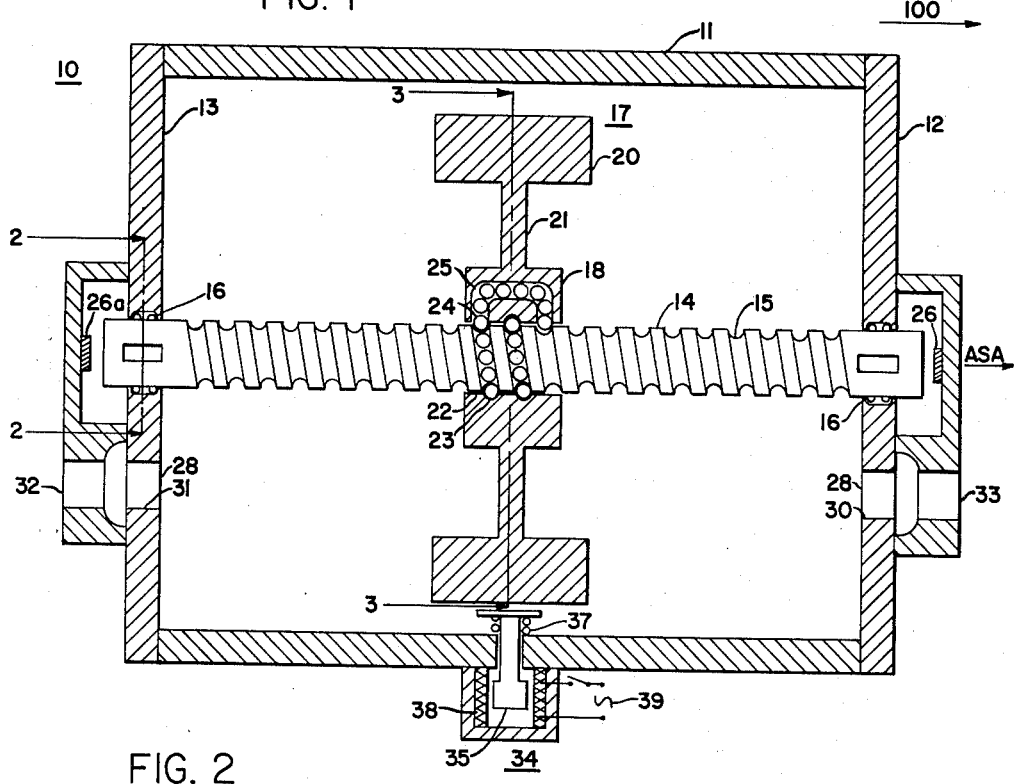
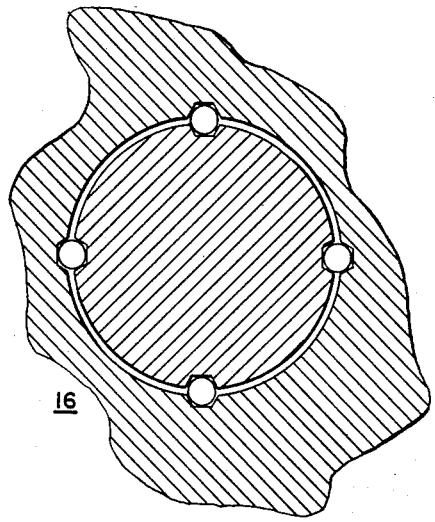
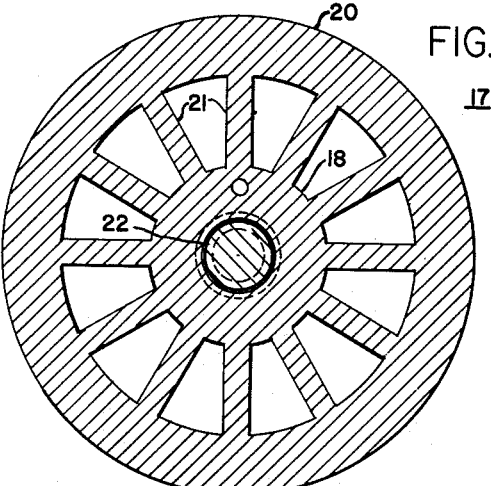
INVENTOR
CHARLES H. WALDHAUER, JR.
BY Roger W. Jensen
ATTORNEY Feb. 11, 1964   C. H. WALDHAUER, JR   3,120,760
ACCELEROMETER
Filed April 4, 1960   2 Sheets-Sheet 2
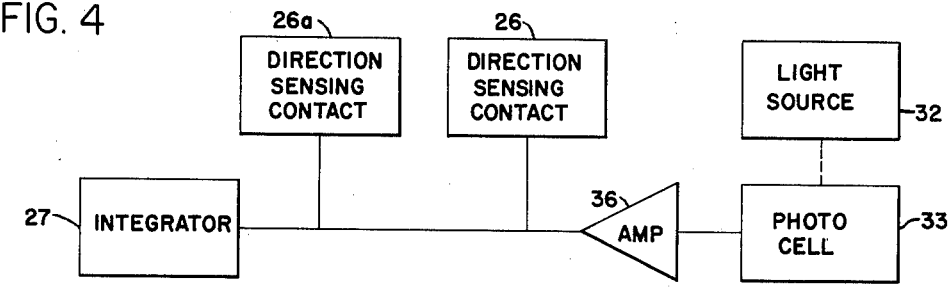
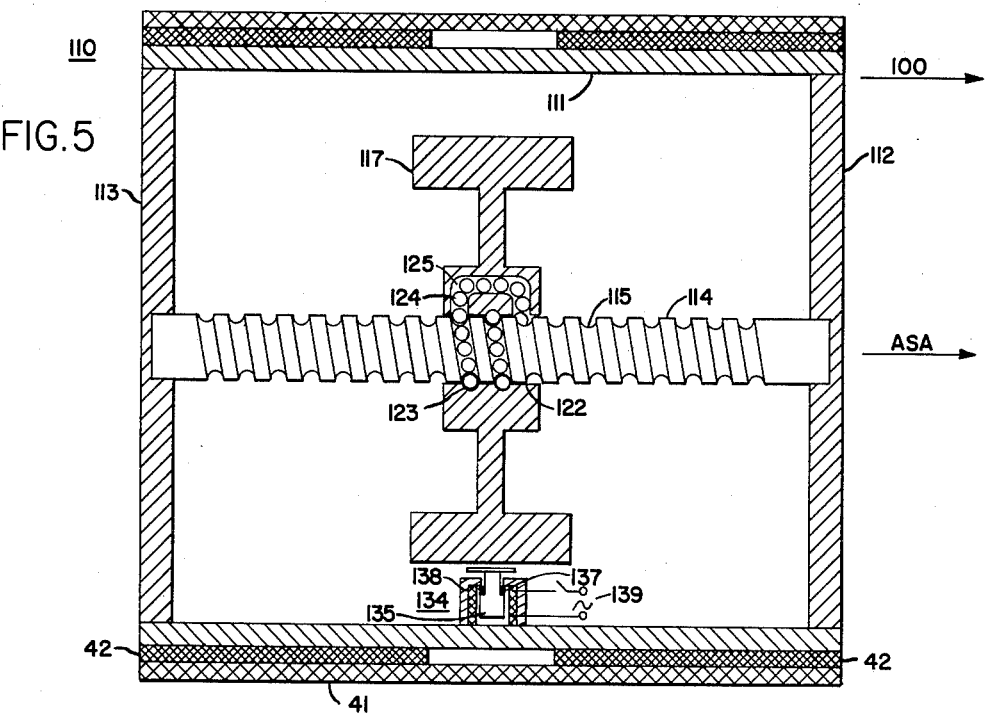
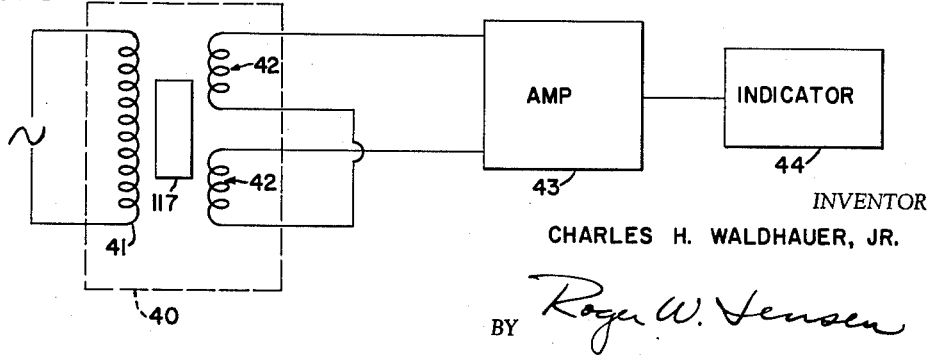
INVENTOR
CHARLES H. WALDHAUER, JR.
BY Roger W. Jensen
ATTORNEY United States Patent Office 3,120,760
Patented Feb. 11, 1964

3,120,760
ACCELEROMETER
Charles H. Waldhauer, Jr., Canoga Park, Calif., assignor to Minneapolis-Honeywell Regulator Company, Minneapolis, Minn., a corporation of Delaware
Filed Apr. 4, 1960, Ser. No. 19,657
17 Claims. (Cl. 73—490)

This invention pertains to an accelerometer means, and more specifically to an integrating accelerometer.

This invention provides a simple, rugged, and reliable apparatus for instantaneously indicating the linear acceleration of an object moving with a variable speed. In addition, this improved accelerometer requires no power for operation or standby, except to pickoff the output signals. The invention includes a rotatably mounted mass means or more specifically, a ballscrew means in combination with a pickoff means which produces a velocity or a distance signal, the distance signal being simply the integral of the velocity signal.

It is therefore an object of this invention to provide an improved accelerometer means.

Another object of the invention is to provide an improved integrating accelerometer means.

These and other objects of the invention will become apparent from a study of the accompanying specification and claims in conjunction with the drawings in which:

FIGURE 1 is a vertical sectional view through one form of the accelerometer means;

FIGURE 2 is a sectional view as viewed along section line 2—2 of FIGURE 1;

FIGURE 3 is a sectional view as viewed along section line 3—3 of FIGURE 1;

FIGURE 4 is a schematic diagram of the accelerometer means shown in FIGURE 1;

FIGURE 5 is a vertical sectional view of an acecelerometer means somewhat modified from that shown in FIGURE 1; and FIGURE 6 is a schematic diagram of the accelerometer means shown in FIGURE 5.

Referring now to FIGURE 1, reference numeral 10 generally identifies an acceleration sensor comprising a hollow cylindrical base or support or housing member 11 having associated therewith end plates 12 and 13 forming an evacuated container. A threaded shaft 14 having a helical concave ball race 15 is supported at either end by means of a ball spline 16. The two ball splines 16 are centrally positioned in end plates 12 and 13 and permit relative axial movement between housing 11 and shaft 14 while preventing rotational movement thereof. A ball spline 16 is best illustrated in FIGURE 2.

A wheel-like mass member 17 having a central portion 18, a rim portion 20, and a plurality of equally spaced radial spokes 21 joining the central and rim portions 18 and 20, is rotatably mounted on shaft 14 by a rotatable mounting, or in a more specific embodiment, by a ballscrew means and is concentric therewith. It should be noted that the mass member 17 is not restricted to the particular embodiment shown in FIG. 3, and that the apertures between the spokes may take various shapes depending on the type of output waves desired. The ballscrew mounting includes threaded shaft 14 having a helical concave ball race 15, the central portion 18 of mass member 17 having a threaded bore 22 therethrough which contains a mating concave helical ball race 23, and a plurality of balls 24 which are placed within ball race 23 and provide a means of engagement between mass member 17 and shaft 14. Central portion 18 also contains a ball return tube 25 through which the balls 24 constantly recirculate upon rotation of mass member 17, however, it will be understood that when mass member 17 is not rotating relative to shaft 14 the balls 24 are at rest and are not recirculating. This ballscrew means allows mass member 17 to rotate relative to shaft 14 with a minimum of friction.

End plates 12 and 13 each contain a direction sensing contact 26 and 26a respectively, adjacent to the end of shaft 14 and aligned therewith. Either one or the other of the direction sensing contacts 26 or 26a is activated and produces a signal when shaft 14 moves axially relative to housing 11 upon acceleration of the accelerometer sensor 10. The signal from the direction sensing contact 26 or 26a is connected to an integrating means 27, to be described in detail below, or other suitable counter means to control the algebraic sense of the integrating means 27 or the counter means.

End plates 12 and 13 each contain an aperture, 30 and 31 respectively, which are aligned parallel to the axis of shaft 14 and positioned at a radial distance from the axis of shaft 14 equal to the distance to the centroid of the spokes 21. The apertures 30 and 31 are hermetically sealed with a transparent material 28. End plates 13 contains a light source 32 which is positioned adjacent to aperture 31 and aligned therewith. End plate 12 contains a light responsive means 33 which is positioned adjacent to aperture 30 and aligned therewith. Light responsive means 33 may be of any suitable type such as, for example, a photo transistor, and is effective to produce signals indicative of the amount of light impinging upon its sensitive surface. A beam of light is transmitted from the light source 32 through the transparent material 28 in aperture 31, through the openings between the spokes 21 of mass member 17, through the transparent material 28 of aperture 30, to the light responsive means 33. The beam of light is interrupted intermittently by the spokes 21 as the mass member 17 rotates upon acceleration of acceleration sensor 10. Therefore, light responsive means 33 produces a signal indicative of the angular velocity of the mass member 17.

The schematic diagram, FIGURE 4, shows the arrangement of the electrical connections of the accelerometer sensor 10. The light source 32 is shown connected to light responsive means 33 by a dotted line indicating the transmission of light therebetween. The output signal of light responsive means 33 is connected to a suitable amplifier means 36 which is connected to the integrator means 27. The output signal of the direction sensing contacts 26 or 26a is also connected to the integrator means 27 to control the algebraic sense of the integrator means 27. The integrator means 27 is a suitable device such as an electrical pulse counting means capable of integrating the signal being produced by the light responsive means 33 and producing an output signal indicative of the distance the acceleration sensor 10 has traveled. It will be understood that the acceleration sensor 10 measures the net velocity or the net distance traveled.

A caging means 34 is provided to restrict the movement of the mass member 17 until the desired time. Said caging means comprising a rod-like brake element 35, spring 37, coil means 38 and a coil energizing means 39.

Said brake element 35 is normally biased against mass member 17 by said spring 37. When coil energizing means 39, energizes coil means 38, brake element 35 overcomes the force of the biasing spring 37 and moves away from mass member 17, freeing said mass member for rotation relative to shaft 14. It should be noted that the caging means 34 shown is only one of a number of caging means which may be utilized. The caging means 34 shown is of a type familiar to those skilled in the art and is capable of caging mass member 17 when it is located in the central position shown, another type of caging means not shown, being required for caging mass member 17 in a different position.

Operation

In FIGURE 1 the acceleration sensitive axis is depicted by the double ended arrow ASA which coincides with the longtiudinal axis of shaft 14. The acceleration sensor 10 in operation, would be mounted on the device of which the velocity and distance measurements are desired and coil means 38 would be energized by coil energizing means 39 uncaging mass member 17.

In the absence of any acceleration along the ASA, the shaft 14 remains in its initial position and there is no relative axial movement between shaft 14 and housing 11 and therefore no signal is produced by the direction sensing contacts 26 and 26a. Mass member 17 also remains in its initial position and there is no relative angular movement between mass member 17 and shaft 14. Consequently, the light responsive means 33 receives a constant beam of light and produces a constant signal. Since the integrator means 27 is receptive only to a pulsating signal it does not produce an output signal.

Assume that an acceleration is imparted to the acceleration sensor 10 along the ASA in the direction indicated by the arrow 100 in FIGURE 1. The ball spline 16 permits shaft 14 to move axially to the left with respect to the housing 11, this causes the direction sensing contact 26a adjacent to the left end of shaft 14 to activate and produce a signal which is transmitted to the integrator means 27 to control the algebraic sense of the output signal of the integrator means 27.

The acceleration of acceleration sensor 10 produces a reactive force in the mass member 17 which is applied through the ballscrew means and becomes an accelerating torque on mass member 17 causing it to rotate counterclockwise when viewed from the left end of FIGURE 1. From the basic laws of dynamics, it can be determined that the angular velocity of mass member 17 with respect to shaft 14 is proportional to the linear velocity of the acceleration sensor 10. It follows that the total angular displacement of mass member 17 is proportional to the linear distance the acceleration sensor 10 has moved. The rotation of mass member 17 causes the spokes 21 to intermittently interrupt the beam of light impinging on the light responsive means 33. Light responsive means 33 is connected to the integrator means 27 which produces a signal indicative of the linear distance the acceleration sensor 10 has traveled. Since the direction sensing contacts 26 control the algebraic sense of the pulses received by the integrator means 27 from the light responsive means 33, it will be understood that the acceleration sensor 10 measures the net linear distance.

Referring now to FIGURE 5, reference numeral 110 generally identifies an acceleration sensor utilizing a different pickoff means 40 than that shown in FIGURE 1. A hollow cylindrical housing, or base, or support member 111 is associated with end plates 112 and 113 to form an evacuated container. A threaded shaft 114 having a helical concave ball race 115 is rigidly mounted at either end to end plates 112 and 113, respectively.

A substantially cylindrical core or mass member 117 having a threaded bore 122 therethrough is rotatably mounted by means of a ballscrew on shaft 114 and is concentric therewith. This ballscrew mounting includes threaded shaft 114 having a helical concave ball race 115, the core member 117 having a threaded bore 122 therethrough which contains a mating concave helical ball race 123 and a plurality of balls 124 which are placed within ball race 123 and provide the medium of engagement between core member 117 and shaft 114. Core member 117 also contains a ball return tube 125 through which the balls 124 constantly recirculate upon rotation of mass member 117, however, it will be understood that when mass member 117 is not rotating relative to shaft 114 the balls 124 are at rest and are not recirculating. This ballscrew type of mounting allows core member 117 to rotate relative to shaft 114 with a minimum of friction.

A primary coil 141 and secondary coils 142 of a differential transformer pickoff means 40 are wound around the periphery of housing member 11. The differential transformer pickoff means 40 is shown schematically in FIGURE 6. The core member 117 acts as the transformer slug. The secondary coils 142 are connected in opposition in the usual manner and are then connected to an amplifier means 43 which in turn is connected to an indicator means 44.

A caging means 134 is also provided to restrict the angular movement of the core member 117 until the desired time. Said caging means comprising a rod-like brake element 135, a spring 137, a coil means 138, and a coil energizing means 139. Said coil means and said coil energizing means cooperating to hold brake element 135 against mass member 117 to prevent rotation of said mass member. Upon termination of signal from coil energizing means 139 brake element 135 is forced away from mass member 117 by spring 137 thereby freeing mass member for rotation. It should be noted that the caging means 134 shown is only one of a number of caging means which may be utilized.

In operation the signal from coil energizing means 139 would be terminated uncaging mass member 117. With no acceleration present, core member 117 will remain in its initial position and there will be no relative movement between mass member 117 and shaft 114. Therefore, the slug or core member 117 of the differential transformer pickoff means 40 remains centrally positioned relative to the secondary coils 142, hence substantially equal amounts of current are induced in each secondary coil 142. Since the coils are connected in opposition, the net current output of the secondary coils 142 is zero. Consequently, the indicator means 44 does not produce an output signal.

Assume that an acceleration is imparted to the acceleration sensor 110 along the ASA in the direction indicated by the arrow 100 on FIGURE 5. The acceleration produces a reactive force in the core member 117 which is applied through the rotatable mounting or ballscrew mounting and becomes an accelerating torque on core member 117 causing it to rotate counterclockwise as viewed from left end of FIGURE 5. As core member 117 rotates it moves axially along the threaded shaft 114. It can be shown, that the axial distance core member 117 moves with respect to shaft 114 is proportional to the distance the acceleration sensor 110 has moved. Consequently, as core member 117 rotates and moves axially to the left on shaft 114 a larger current will be induced in one of the secondary coils 142 than in the other and the net current output of the two secondary coils 142 connected in opposition will be indicative of the axial displacement of core member 117 relative to shaft 114. This current, therefore, is proportional to the distance the acceleration sensor 110 has traveled. This output current is amplified by suitable amplifying means 43 and connected to a suitable indicator means 44 which produces an output signal indicative of the linear distance the accelerometer sensor 110 has traveled.

While I have shown and described a specific embodiment of this invention, further modification and improvements will occur to those skilled in the art. I desire to be understood, therefore, that this invention is not limited to the particular form shown, and I intend in the appended claims to cover all modifications which do not depart from the spirit of the scope of this invention.

What I claim is:

1. In a double integrating accelerometer: a threaded shaft mounted within a hollow cylindrical evacuated housing; a wheel-like mass member having a central portion, a rim portion, and a plurality of radial spokes forming shaped apertures and joining said central and rim portions, said central portion having a threaded bore therethrough, and said mass member being rotatably mounted on said shaft and concentric therewith; said rotatable mounted on said shaft and concentric therewith; said rotatable mounting including a recirculating ballscrew permitting relative angular movement between said shaft and said mass member upon acceleration of said accelerometer; said shaft being attached at each end to the end plates of said housing by means of a ball spline permitting axial movement of said shaft relative to said housing and preventing rotation of said shaft; said end plates each containing a direction sensing contact located adjacent to the end of said shaft and aligned therewith, said direction sensing contacts producing a signal upon acceleration of said accelerometer along acceleration sensing axis, ASA; said ASA being defined as identical to the axis of said shaft; said signal being connected to an integrating means to control the algebraic sense of said integrating means; caging means coacting with said mass member restricting movement of said mass member; said caging means releasing said mass member upon appropriate signal; said end plates each containing an aperture hermetically sealed with a transparent material, said apertures being aligned on an axis parallel to said ASA and being positioned at a radial distance from said ASA equal to the distance to the centroid of said spokes; a light source being adjacent to said apertures of one of said end plates and aligned therewith; light responsive means being located adjacent to said apertures of the other of said end plates and aligned therewith, said light source and said light responsive means being positioned such that a beam of light is transmitted from said light source through said aperture of said one of said end plates, said radial spokes of said mass member, said aperture of said other of said end plates to said light responsive means; the transmission of light being interrupted intermittently as said spokes rotate due to acceleration of said accelerometer, said light responsive means producing a signal indicative of the angular velocity of said mass member; means connecting said light responsive means with said integrator means; said integrating means providing an output signal indicative of linear distance said accelerometer has traveled.

2. In an integrating accelerometer: a threaded shaft mounted within a hollow cylindrical housing; a wheel-like mass member having a central portion, a rim portion, and a plurality of spokes forming shaped apertures and joining said central and rim portions, said central portion having a threaded bore therethrough, and said mass member being rotatably mounted on said shaft and concentric therewith; said rotatable mounting including a recirculating ballscrew permitting relative angular movement between said shaft and said mass member; said shaft being attached at one end to one end plate and at the other end to the other end plate of said housing by means of a ball spline permitting axial movement and preventing rotational movement of said shaft relative to said housing; said one end plate and said other end plate each containing a direction sensing contact located adjacent to the end of said shaft and aligned therewith, said direction sensing contacts producing a signal upon acceleration of said shaft along acceleration sensing axis, ASA; said ASA being defined as identical to axis of said shaft, said signal being connected to counter means to control the algebraic sense of said counter means; caging means coacting with said rim portion restricting movement of said mass, said caging means allowing movement of said mass member upon appropriate signal; said one end plate and said other end plate each containing an aperture, said apertures aligned on an axis parallel to said ASA and being positioned at a radial distance from said ASA equal to the distance to the centroid of said spokes; a light source adjacent to said aperture of said one end plate and aligned therewith; a light responsive means adjacent to said aperture of said other end plate and aligned therewith, said light source and said light responsive means being positioned so that a beam of light is transmitted from said light source through, said aperture of said one end plate, said spokes of said mass member, said aperture of said other end plate to light responsive means; the transmission of light being interrupted intermittently as said spokes rotate due to acceleration of said accelerometer, said light responsive means producing a signal indicative of the angular velocity of said mass member, means connecting said light responsive means to said counter means, said counter means giving an output signal indicative of the linear velocity of said accelerometer.

3. In a control apparatus: a non-rotatable threaded shaft, a housing, a substantially cylindrical mass member comprising a central portion containing an internally threaded bore, and a rim portion being connected by an intermediate portion containing a plurality of equally spaced openings; said mass member rotatably mounted on said shaft by means of a recirculating ballscrew permitting relative angular movement thereof upon acceleration of said accelerometer; said shaft attached at each end to the end plates of said housing by means of a ball spline permitting axial movement and preventing rotational movement of said shaft relative to said housing; said end plates each containing a direction sensing contact which produces a signal upon acceleration of said shaft along acceleration sensing axis, ASA; said ASA being defined as identical to the axis of said shaft; said signal being connected to integrating means to control the algebraic sense of said integrating means; said end plates each containing an aperture aligned on an axis parallel to, and at a radial distance from, said ASA equal to the distance to the center of said openings; a light source and a light responsive means being positioned such that a beam of light is transmitted through one of said apertures, the openings of said intermediate portion, the other of said apertures to said light responsive means; the transmission of light being interrupted intermittently as said mass member rotates; said light responsive means producing a signal indicative of angular velocity of said mass member; means connecting said integrating means with said light responsive means; said integrating means giving an output signal indicative of the linear distance said control apparatus has traveled.

4. In a control apparatus: a threaded shaft, a support, a substantially cylindrical mass member internally threaded and containing a plurality of openings therethrough rotatably mounted in said shaft, said rotatable mounting including a recirculating ballscrew means permitting relative angular movement between said shaft and said housing upon acceleration of said shaft; said shaft being attached to the end plates of said support by ball spline means permitting axial and preventing rotational movement therebetween; said end plates each containing a direction sensing contact which produce a signal upon acceleration of said shaft; said signal being connected to counter means; said end plates containing apertures aligned on an axis parallel to said shaft; a light source and a light responsive means being positioned such that a beam of light is transmitted through one said aperture, the openings of said mass member, and the second said aperture to light responsive means; transmission of light being interrupted intermittently as said mass member rotates; said light responsive means producing a signal indicative of angular velocity of said mass member; means connecting said signal of said light responsive means to said counter means, said counter means giving an output signal indicative of a linear velocity of said control apparatus.

5. In a control apparatus: a non-rotatable threaded shaft being mounted on a support permitting axial movement therebetween; an internally threaded cylindrical mass containing a plurality of apertures rotatably mounted on said shaft, said mounting permitting relative angular movement thereof upon acceleration of said shaft and including recirculating ballscrew means; said support containing direction sensing means adapted to produce a signal indicative of the direction of acceleration along said shaft; said direction sensing means being connected to a counter means; said support containing a light source and a light responsive means positioned such that a beam of light is transmitted from said light source through said apertures to said light responsive means, the transmission of light being interrupted intermittently as said mass rotates, said light responsive means producing a signal indicative of angular velocity of said rotatable mass, and said signal of said light responsive means being connected to a counter means giving an output signal indicative of the linear displacement of said control apparatus.

6. In a control apparatus: support means; a threaded shaft, said shaft being mounted on said support so as to prevent rotation therebetween; an internally threaded mass containing a plurality of apertures therethrough rotatably mounted on said shaft, means connecting said shaft and said mass to permit relative angular movement therebetween; said support containing direction sensing contacts which are activated upon acceleration; integrating means; means connecting said direction sensing contacts and said integrating means; a light source and a light responsive means attached to said support such that a beam of light is transmitted from said light source through said apertures to said light responsive means, the transmission of light being interrupted intermittently as said mass rotates due to acceleration of said control apparatus, said light responsive means producing a signal indicative of angular velocity of said rotatable mass, said signal being connected to said integrating means giving an output signal indicative of the linear distance said control apparatus has traveled.

7. In a control apparatus: a threaded shaft; a base, said shaft being mounted on said base so as to prevent rotation therebetween; an internally threaded mass containing a plurality of apertures therethrough rotatably mounted on said shaft, said mass rotating relative to said shaft upon acceleration of said control apparatus; photoelectric pickoff means providing a signal indicative of the angular velocity of said mass; and means connecting said signal to counter means, said counter means producing an output signal indicative of the linear displacement of said control apparatus.

8. In a double integrating accelerometer: a threaded shaft rigidly mounted within a hollow cylindrical evacuated housing; a substantially cylindrical core member having a threaded bore therethrough rotatably mounted on said shaft and concentric therewith; said rotatable mounting including a recirculating ballscrew means permitting relative axial movement of said core member relative to said shaft upon acceleration of said shaft; caging means coacting with said core member and restricting movement thereof, said caging means being released by a proper signal; differential transformer means providing a signal proportional to the axial movement of said core member relative to said shaft, said transformer means including said core member, primary coil, and secondary coils, at least a portion of said core member characterized by having high magnetic permeability, said coils being supported by said housing, said signal of said differential transformer means being connected from said secondary coils to an amplifier means and to an indicator means, said indicator means producing a signal indicative of linear distance the accelerometer has traveled.

9. In an integrating accelerometer: an evacuated housing rigidly supporting a threaded shaft; a substantially cylindrical mass member having a threaded bore therethrough rotatably mounted on said shaft, said rotatable mounting including a recirculating ballscrew means permitting relative axial movement of said mass member relative to said shaft upon acceleration thereof; caging means restricitng movement of said mass member when required; differential transformer means adapted to produce a signal proportional to the axial movement of said mass member, said transformer means including said mass member, primary windings, and secondary windings, at least a portion of said mass member characterized by having high magnetic permeability, said housing supporting said windings, said signal of said differential transformer means being indicative of the linear distance accelerometer has traveled.

10. In a control apparatus: a threaded shaft rigidly fixed to a support; a mass member having a threaded bore therethrough and being rotatably mounted on said shaft by means of a recirculating ballscrew, said mounting permitting axial movement of said mass relative to said shaft upon acceleration thereof; differential transformer pickoff means including said mass member, a primary winding, and secondary windings, at least a portion of said mass member characterized by having high magnetic permeability, said windings being attached to said support, said pickoff means producing a signal indicative of axal movement of said mass, and said signal being connected to an indicator means producing a signal indicative of the linear distance said apparatus has moved.

11. In a control apparatus: a housing rigidly supporting a threaded shaft; a rotatable mass having a threaded bore therethrough and attached to said shaft by a recirculating ballscrew means permitting relative axial movement between said mass and said shaft upon acceleration thereof, at least a portion of said mass characterized by having high magnetic permeability; said housing supporting inductive pickoff means including primary and secondary windings and said mass and producing a signal proportional to the axial movement of said mass, said signal being indicative of the linear displacement of said apparatus.

12. In a control apparatus: a base rigidly supporting a threaded shaft; an internally threaded mass member rotatably mounted on said shaft by means of a recirculating ballscrew permitting axial movement therebetween, at least a portion of said mass member characterized by having high magnetic permeability; said base supporting primary and secondary windings of an inductive pickoff means, said windings coating with said mass chamber member and producing a signal proportional to the axial movement of said mass member upon acceleration of the apparatus, said signal being indicative of the linear distance said apparatus has moved.

13. In a control apparatus: a support rigidly holding a threaded shaft; an internally threaded mass mounted on said shaft so as to permit relative axial movement therebetween upon acceleration of said apparatus, at least a portion of said mass characterized by having high magnetic permeability; and inductive pickoff means including primary and secondary windings and said mass member adapted to produce a signal indicative of axial movement of said mass, said signal being indicative of the linear displacement of said apparatus.

14. In a linear accelerometer: support means; a threaded shaft mounted on said support means so as to prevent rotation therebetween; a symmetrically shaped mass element having a threaded bore therethrough rotatably mounted on said shaft for substantially unrestrained rotation therebetween upon acceleration of said accelerometer; and means for sensing the angular velocity of said mass element relative to said support means.

15. In a control apparatus: support means; a threaded shaft mounted on said support means so as to prevent rotation therebetween; a symmetrically shaped mass element having a threaded bore therethrough rotatably mounted on said shaft for substantially unrestrained rotation therebetween upon acceleration of said apparatus; and means for sensing the axial displacement of said mass element relative to said support means.

16. In a control apparatus: support means; a threaded shaft mounted on said support means so as to prevent rotation therebetween; a symmetrically shaped mass element having a threaded bore therethrough rotatably mounted on said shaft for substantially unrestrained rotation therebetween; and means for sensing the angular velocity of said mass element relative to said support means upon acceleration of said apparatus; means connected to said angular velocity sensing means for producing a signal indicative of said angular velocity; and means connected to said signal producing means for integrating said signal so as to produce a signal indicative of the time integral of said angular velocity signal.

17. In a linear accelerometer: support means; a threaded shaft mounted on said support means so as to prevent rotation therebetween upon acceleration of said accelerometer; a symmetrically shaped mass element having a threaded bore therethrough rotatably mounted on said shaft for substantially unrestrained rotation therebetween; and means responsive to the axial displacement of said mass element relative to said support means.

References Cited in the file of this patent

UNITED STATES PATENTS

| | | |
|---|---|---|
| 2,289,864 | Belinkine | July 14, 1942 |
| 2,427,239 | Taylor | Sept. 9, 1947 |
| 2,570,672 | Hathaway | Oct. 9, 1951 |
| 2,882,034 | Wuerth | Apr. 14, 1959 |
| 2,898,416 | Clurman | Aug. 4, 1959 |